US009087017B2

(12) United States Patent
Mace et al.

(10) Patent No.: US 9,087,017 B2
(45) Date of Patent: Jul. 21, 2015

(54) CONTROLLING LATENCY AND POWER CONSUMPTION IN A MEMORY

(75) Inventors: Timothy Charles Mace, Haverhill (GB); Ashley John Crawford, Saffron Walden (GB)

(73) Assignee: ARM Limited, Cambridge (GB)

( * ) Notice: Subject to any disclaimer, the term of this patent is extended or adjusted under 35 U.S.C. 154(b) by 877 days.

(21) Appl. No.: 13/317,245

(22) Filed: Oct. 13, 2011

(65) Prior Publication Data

US 2012/0210055 A1  Aug. 16, 2012

(30) Foreign Application Priority Data

Feb. 15, 2011  (GB) .................................. 1102608.5

(51) Int. Cl.
*G06F 12/00* (2006.01)
*G06F 13/16* (2006.01)
*G06F 1/32* (2006.01)

(52) U.S. Cl.
CPC .......... *G06F 13/1626* (2013.01); *G06F 1/3225* (2013.01); *G06F 13/161* (2013.01)

(58) Field of Classification Search
CPC ....... G06F 12/00; G06F 13/161; G06F 13/16; G06F 13/1663; G06F 1/3275; G06F 13/18
See application file for complete search history.

(56) References Cited

U.S. PATENT DOCUMENTS

| 6,021,076 | A | 2/2000 | Woo et al. |
| 6,427,189 | B1 | 7/2002 | Mulla et al. |
| 6,563,506 | B1 | 5/2003 | Wang |
| 6,667,926 | B1 * | 12/2003 | Chen et al. ..................... 365/221 |
| 2003/0046506 | A1 | 3/2003 | De Perthuis et al. |
| 2005/0180254 | A1 * | 8/2005 | Tobescu et al. ............... 365/233 |
| 2006/0143315 | A1 * | 6/2006 | Rudeseal et al. .................. 710/5 |
| 2006/0168383 | A1 | 7/2006 | Lin |
| 2009/0016137 | A1 | 1/2009 | Hur et al. |
| 2010/0121865 | A1 * | 5/2010 | Vaid et al. ..................... 707/758 |

FOREIGN PATENT DOCUMENTS

JP  2005-242408  9/2005

OTHER PUBLICATIONS

International Search Report and the Written Opinion of the International Searching Authority dated May 14, 2012 in PCT/GB2012/050231.
International Preliminary Report on Patentability mailed Aug. 29, 2013 in PCT/GB2012/050231.

* cited by examiner

*Primary Examiner* — Reginald Bragdon
*Assistant Examiner* — Thanh D Vo
(74) *Attorney, Agent, or Firm* — Nixon & Vanderhye P.C.

(57) ABSTRACT

Memory circuitry, a data processing apparatus and a method of storing data are disclosed. The memory circuitry comprises: a memory for storing the data; and control circuitry for controlling power consumption of the memory by controlling a rate of access to the memory such that an average access delay between adjacent accesses is maintained at or above a predetermined value; wherein the control circuitry is configured to determine a priority of an access request to the memory and to maintain the average access delay at or above the predetermined value by delaying at least some accesses from access requests having a lower priority for longer than at least some accesses from access requests having a higher priority.

22 Claims, 8 Drawing Sheets

CONTROLLING LATENCY AND POWER CONSUMPTION IN A MEMORY

This application claims priority to UK Patent Application No. 1102608.5 filed 15 Feb. 2011, the entire contents of each of which are hereby incorporated by reference.

BACKGROUND OF THE INVENTION

1. Field of the Invention

The present invention relates to the field of data storage and in particular to controlling the latency and power consumption of a memory.

2. Description of the Prior Art

As memories such as DRAM increase in size and as they are mounted within systems in ever closer relation to each other and are on occasion stacked on top of each other, the power consumption of these memories may need to be controlled to avoid them overheating.

With DRAM memories for example, there is significant power consumed when a line or row in the DRAM is activated. FIG. 1 shows an example of a conventional DRAM memory bank 5 consisting of 8 banks of memory 10. These memory banks are formed of arrays of data storage locations and an activation of a row in response to a row address in a data access will result in sense amplifiers 12 being fired and either the data that is stored in capacitors within the row being discharged onto the sense amplifiers, or data being written to the sense amplifiers and in the following precharge phase being stored in the capacitors in the row.

For a read for example, once the data from a row is stored in the sense amplifiers it may be accessed in dependence upon a column address input to multiplexer 14 and if several columns in the same row are accessed only one raw will need to be activated for the access of these several items. However, the transferring of the data will take some time and will limit the activation rate for the memory. This is illustrated by the graph in FIG. 1 that shows how activation time changes with the length of the packet size, that is the number of bits of data output for the row. If only one or a very few data items from a row are accessed, then this does not take long and a subsequent access to a different memory bank can occur quite quickly. As these accesses all require row activation and subsequent precharge this can result in relatively large power consumption of the memory and this can lead to overheating. Thus, memories are generally designed with a minimum access time between subsequent accesses or row activations and a further constraint of a minimum time for four row accesses $t_{FAW}$.

Thus, for example the time between accesses may be limited by the design to be greater than 7.5 ns, while the time for four accesses may be limited to be above 35 ns. These limits are set by the designer of the memory but may not be sufficient to protect the memory from overheating where the memory is mounted in a stack for example. It may also not be sufficient to protect other components within a processing apparatus, and thus, further constraints may need to be applied to limit the speed of access of the memory and thus, its power consumption.

However, limiting the access speed to a memory increases its latency and decreases the performance of devices using the memory. It would be desirable to reduce power consumption without unduly affecting performance.

SUMMARY OF THE INVENTION

Viewed from a first aspect, the present invention provides memory circuitry for storing data comprising: a memory for storing said data; and control circuitry for controlling power consumption of said memory by controlling a rate of access to said memory such that an average access delay between adjacent accesses is maintained at or above a predetermined value; wherein said control circuitry is configured to determine a priority of an access request to said memory and to maintain said average access delay at or above said predetermined value by delaying at least some accesses from access requests having a lower priority for longer than at least some accesses from access requests having a higher priority.

The present invention recognises that although one may need to increase the delay between accesses to a memory to reduce power consumption this has a detrimental effect on the latency of the system. However, it also recognises that it may be more important for the latency of the system that some access requests are not delayed while for others an additional delay may have a lower impact on overall performance. Thus, it provides different delays to the access requests in order to meet a required power consumption target in dependence on a priority of the access requests. In this way high priority requests are in general given a lower latency than low priority requests and the power consumption of the memory is reduced without a corresponding reduction in performance.

The priority of access request can be determined in a number of ways. In some embodiments, said control circuitry is configured to determine said priority of said access request in dependence upon a latency sensitivity of said access request.

The priority of an access request may be determined from its latency sensitivity. In other words, if the access request is not sensitive to an increase in its latency it can be given a low priority and delaying it to achieve the desired reduced power consumption of the memory either will not affect the performance of the device or will only affect it slightly.

In other embodiments the priority of the access request may be determined in dependence upon a type of the access request, a priority level indicator associated with the access request or a source of the access request. Alternatively the priority may be determined in some cases from a plurality of these things.

A type of the access request may be important in that some types of access requests require low latency and impact performances if they are delayed. Furthermore, a source of the access request may affect the latency sensitivity. For example if the source is a processing unit then it may stall while awaiting an access to a memory to complete while other devices such as LCD controllers may fetch data in advance such that a delay will not affect the performance of the system provided it is not longer than the advance that the LCD controller is operating within.

In some embodiments, different devices within a system that access the memory may themselves operate a priority system whereby they assign a priority level to transactions to improve the performance of the system and allow other units using these transactions to be able to prioritise them. In such a system, these priority levels may be reused by the memory controller when assigning access delays to transaction requests. Alternatively, the memory controller may itself set the priority levels in dependence upon the source of the access request, and or the type of the access request and/or the root that the access request has taken to reach the memory.

In some embodiments, said memory circuitry further comprises average access delay determining circuitry for determining said average access delay.

In order to determine whether the average access delay has fallen below a predetermined value the memory circuitry may have average access delay determining circuitry that continually determines this average access delay over a predetermined time or over a predetermined number of access requests. It should be noted that the need to limit power consumption is generally there to limit temperature increases either in the memory itself or in associated devices. However, there is some latency between an increase in power consumption and an associated increase in temperature. Thus, the amount of time that the average time delay is calculated over can be quite large and there can be some latency in any adjustment to the delay if it is noted that the average is falling below the predetermined value.

In some embodiments, said control circuitry is configured to categorise each of said access requests into one of at least two different priority categories and to set an access delay for each of said at least two different priority categories, a higher priority category being given a lower access delay.

In order to set the delays, it may be convenient to categorise the access request into different priority categories and set the delay according to the category they are assigned to.

In some embodiments, said memory is designed with a minimum access delay between adjacent accesses, said minimum access delay being lower than said average access delay; and said control circuitry is configured to provide at least some access requests within said highest priority category with said minimum access delay and access requests within lower priority categories with higher access delays, such that said average access delay is maintained at or above said predetermined value.

The memory may be designed with a minimum access delay between adjacent accesses. In this case, it may be advantageous to provide access request with a highest priority category with this minimum access delay. These access requests are ones that are latency sensitive and delaying them will affect the performance of the device. Thus, it is important that these are delayed as little as possible and any additional delay to these accesses will affect performance. In order for the average access delay not to be exceeded other lower priority categories will have to be provided with higher access delays.

In some embodiments, said control circuitry is configured to maintain a same access delay for requests within each of said priority categories, and to categorise said access requests according to a priority of said access request compared to a threshold value for each of said lower priority categories and compared to a current average access delay, such that if said current average access delay falls below a preset low value at least one of said threshold values is increased such that at least some access requests are categorised with a lower priority and if said current average access delay rises above a preset high value at least one of said threshold values is decreased such that at least some access requests are categorised with a higher priority.

In order to maintain the average access delay at or above the predetermined value there are several ways that this can be done. For example, in some embodiments a same access delay for requests within each of the priority categories is maintained however the threshold value at which access request are categorised can be changed such that if the average access time becomes too low, in other words the accesses are occurring too fast, then the threshold for the priority can be raised so that fewer access requests fall into the high priority category and thus, on average a longer delay will be given to the requests.

They may also be a further value that the system can be tuned with respect to. For example, if the average access delay becomes higher than a certain value then there is an increase in latency in the system and the performance of the system can be improved by decreasing this value. In such a case, the threshold value for the priority categories can be decreased and more access request will fall into the higher priority categories and thus, on average access delay times will fall.

In some embodiments, said access requests comprise a priority indicator indicating one of a plurality of priority levels for said access request, said threshold value for each of said lower priority categories being one of said plurality of priority levels.

In an embodiment where the access request comprises a priority indicator which is one of plurality of priority indicators, then having one of these priority levels as a threshold value to a category and changing the threshold value as required may be a convenient way of re-categorising access requests in an intelligent manner. If there are many priority levels then by changing the threshold value to a different priority level access requests that are slightly less latency sensitive can be removed from the highest priority category or additional latency sensitive access requests can be added as required to maintain the desired average access delay.

In other embodiments, said control circuitry is configured to vary said access delay provided to requests within each of said priority categories in order to maintain said average access delay at or above said predetermined value and between a preset low and a preset high value.

In other embodiments rather than varying the number of access requests that fall into a category the actual delay provided to the category may be varied. Once again a preset low and high value can be used so that the system is tuned to fall within the desirable operating range where power consumption is not too high and yet latency does not increase too much. It may be that the preset low value used is the predetermined average access delay value that the memory is designed with. Alternatively, it may be slightly different to this if the tuning requires this.

In some embodiments, said control circuitry is configured to set said access delay of said access requests in said highest priority category to said minimum access delay and to set a higher delay for each of said priority categories other than said highest priority category, each of said higher delays being limited by a maximum delay, and to increase said access delay of at least one of said access requests in said highest priority category to above said minimum access delay if said average access delay would otherwise fall below said low preset value.

It may be desirable to set the highest priority category with the minimum access delay and set a higher delay for each of the other priority categories. However, if all of the access requests for a certain time fall within the highest priority category then this will not achieve the average value required as providing a longer delay to the lower priority categories will have no effect if there are no lower priority category access requests accessing the memory. Thus, the average rate is also considered when setting the delay and if required at least some of the access request in the highest priority category can be provided with a delay that is longer than the minimum time delay.

Although the memory may be a number of things, in some embodiment it comprises a dynamic memory.

In particular, it may comprise a dynamic random access memory or DRAM, said DRAM comprising a plurality of banks each bank comprising an array, an access to said memory comprising activating a row of one of said banks in dependence upon a row address.

DRAM memories consume significant power in response to accesses and thus, they are temperature sensitive and their access rate needs to be controlled.

In some embodiments, said memory control circuitry further comprises temperature detection circuitry for detecting a temperature of said memory, said control circuitry being configured to increase said predetermined value in response to a signal from said temperature control circuitry indicating a temperature of said memory circuitry has risen above a certain temperature.

Where the power consumption is being controlled to control the temperature of the memory circuitry itself it may be advantageous if there is temperature detection circuitry associated with the memory that detects the temperature and sends a signal if it falls above or below a predetermined temperature. In this way, the power target can be varied in response to how the temperature actually varies and a predetermined average access delay can be directly varied to achieve a desired temperature operating range.

A second aspect of the present invention provides a data processing apparatus comprising a processor for processing data a memory circuitry according to a first aspect of the present invention for storing said data processed by said processor.

A third aspect of present invention provides a method of accessing a memory comprising: receiving an access request for accessing said memory; determining a priority of said access request; providing a delay to said access request in dependence upon said priority by delaying at least some accesses from access requests having a lower priority for longer than at least some accesses from access requests having a higher priority such that an average access delay between adjacent accesses is maintained at or above a predetermined value.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
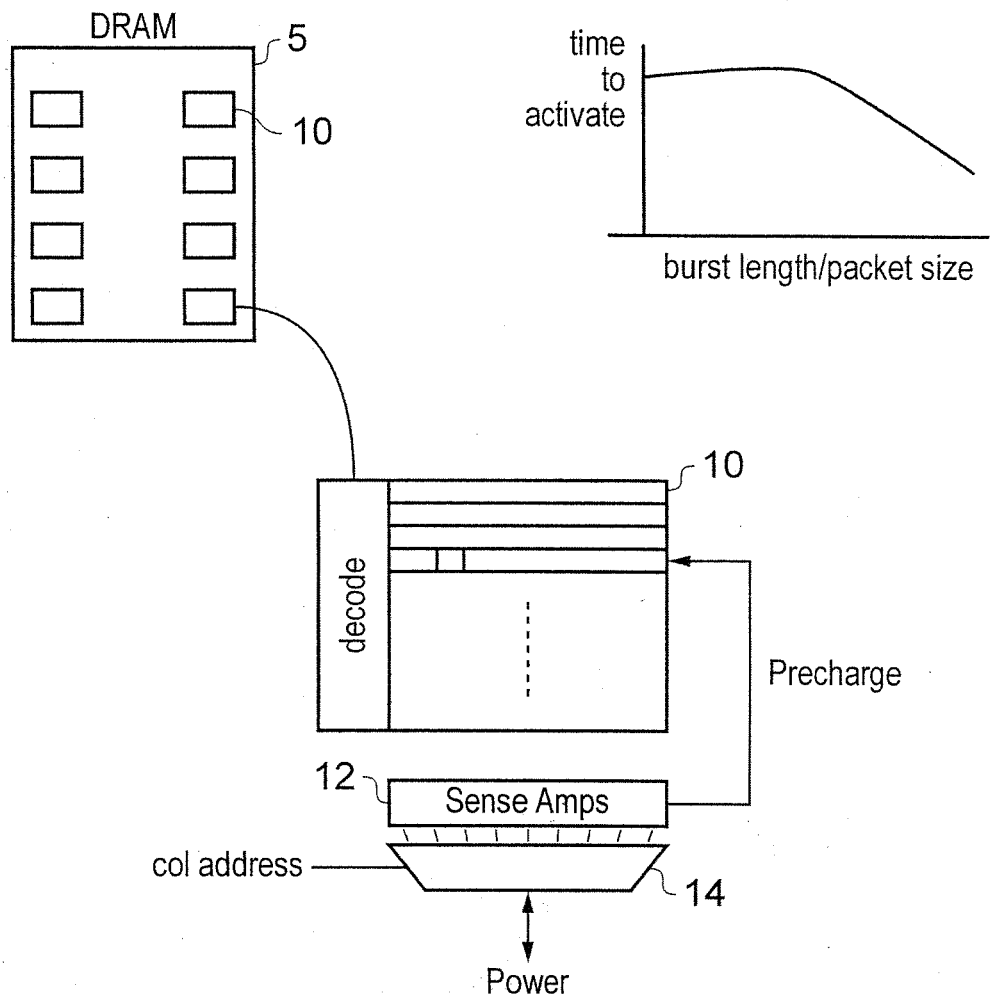
FIG. 1 shows a dynamic random access memory according to the prior art.
Figure 2A:
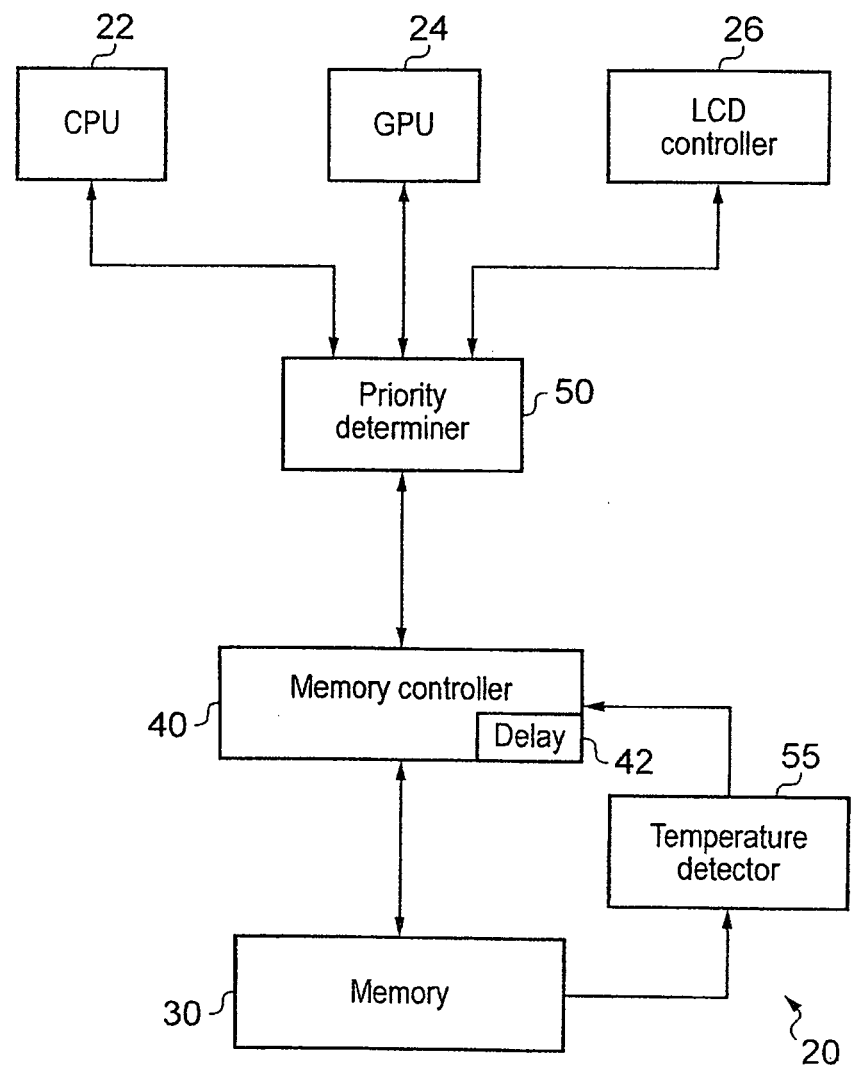
FIGS. 2a and 2b show data processing apparatus according to embodiments of the present invention.

FIG. 2a shows a data processing apparatus 20 according to an embodiment of the present invention. Data processing apparatus 20 has number of devices for processing data. It has a central processing unit or CPU 22 a graphics processing unit GPU 24 and a LCD controller 26. This is purely an example and it should be clear to a skilled person that a processing apparatus having a number of different devices could fall within the scope of the present invention.

These devices all access memory 30 via memory controller 40. There is also a priority determiner 50 within data processing apparatus 20 that determines a priority of a transaction received from these devices. This priority determiner 50 may be associated with memory controller 40 or it may be independent of it and part of the processing apparatus. In the latter case it will be used for increasing the performance in general of the processing apparatus.

The priority determiner 50 assign a priority level which in this example is between 0 and 15 to each of the access requests that it receives and then forwards these to memory controller 40. This priority level may be set in dependence upon the type of access or on the source of the access. For example, accesses from CPU 22 are often more latency sensitive then accesses from either GPU 24 or from the LCD controller 26 and thus, they may be assigned a higher priority level then accesses from the other two devices. It should be noted that although 16 different priority levels are assigned in this example, in other embodiments more or fewer priority levels could be assigned depending on the required degree of discrimination between different access requests.

These access requests with a priority level assigned to them are then transmitted to memory controller 40 which controls the delay with which these access requests are sent to memory 30. In particular, memory controller 40 stores an average delay that it is desirable that the memory controller 40 provides between each access requests in order for the memory not to consume too much power. Thus, delays assigned to each access request vary so that this average is met with the higher priority request being delayed for a shorter time than the lower priority request.

In this embodiment, there is also a temperature detector 55 which detects the temperature of the memory and if it rises above a predetermined level sends a signal to memory controller 40. In response to this signal the memory controller resets the stored average delay value 42 to a higher value such that the rate of access is decreased and power consumption similarly decreases. If on the other hand the temperature of the memory falls to a low value then it is understood that the memory can operate faster and consume more power and a signal is likewise sent to memory controller 40 to overwrite delay value 42 and a smaller average delay value is stored within memory controller 40.

Figure 2B:
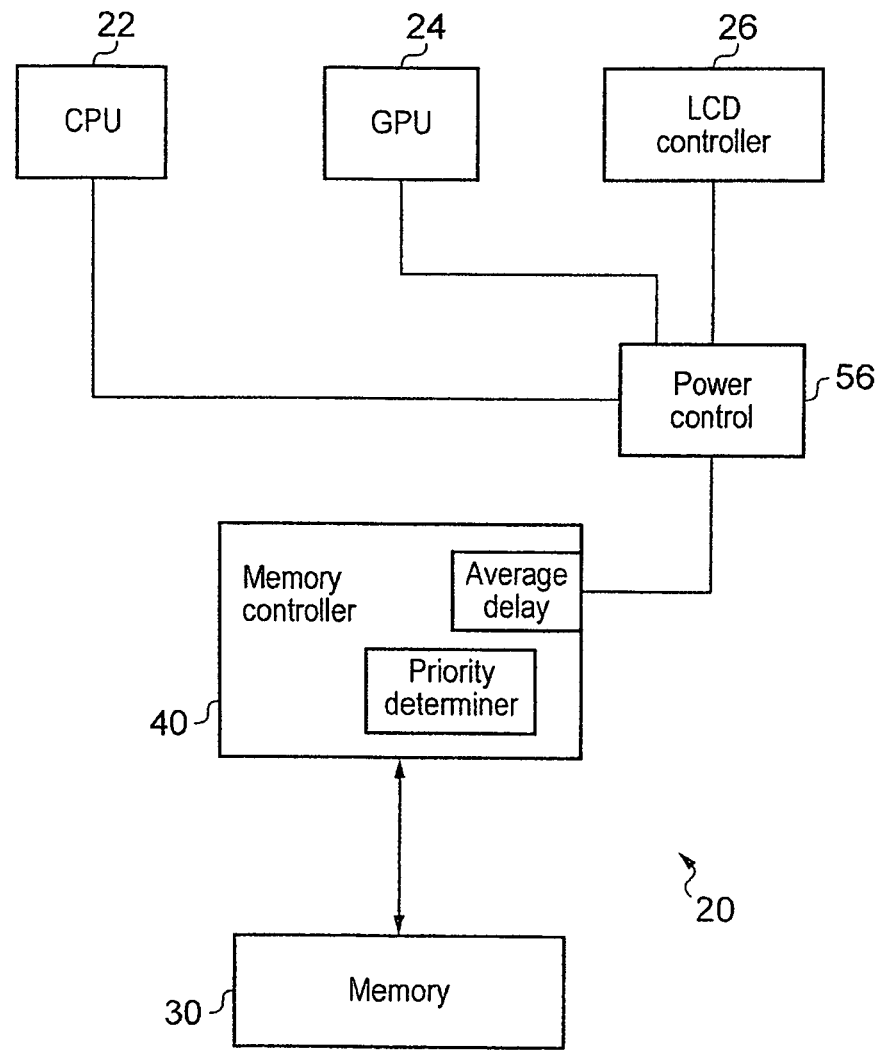

It should be noted that although in this embodiment the temperature detector is shown outside of the memory controller in some embodiments it might be built into the memory controller as indeed is shown in FIG. 2b. Furthermore, although the temperature detector is shown here as detecting the temperature of the memory, in other embodiments the temperature of other components may be critical in determining access request speeds to the memory and in such cases the temperature detector would detect these components and access request delay times would be varied to keep these components within desired limits.

FIG. 2b shows a similar system to that of FIG. 2a, however in this system there is no temperature detector, rather the system is tuned to attain a predetermined average delay time between requests. In this embodiment the desired average delay may be changed in dependence upon signals from the power controller 56. This power controller may be used to control the system to enter a lower or higher performance mode depending on a desired quality of service. Thus, it may be that at certain times it is desirable that less power is consumed and it is acceptable that the apparatus does not operate in a high performance mode. This may be the case where a battery with limited charge left is being used to power the device. In such a case, the memory controller changes the average delay time such that it is increased. This may be done by increasing the delay times that are stored for each of the different priority categories.

Figure 3:
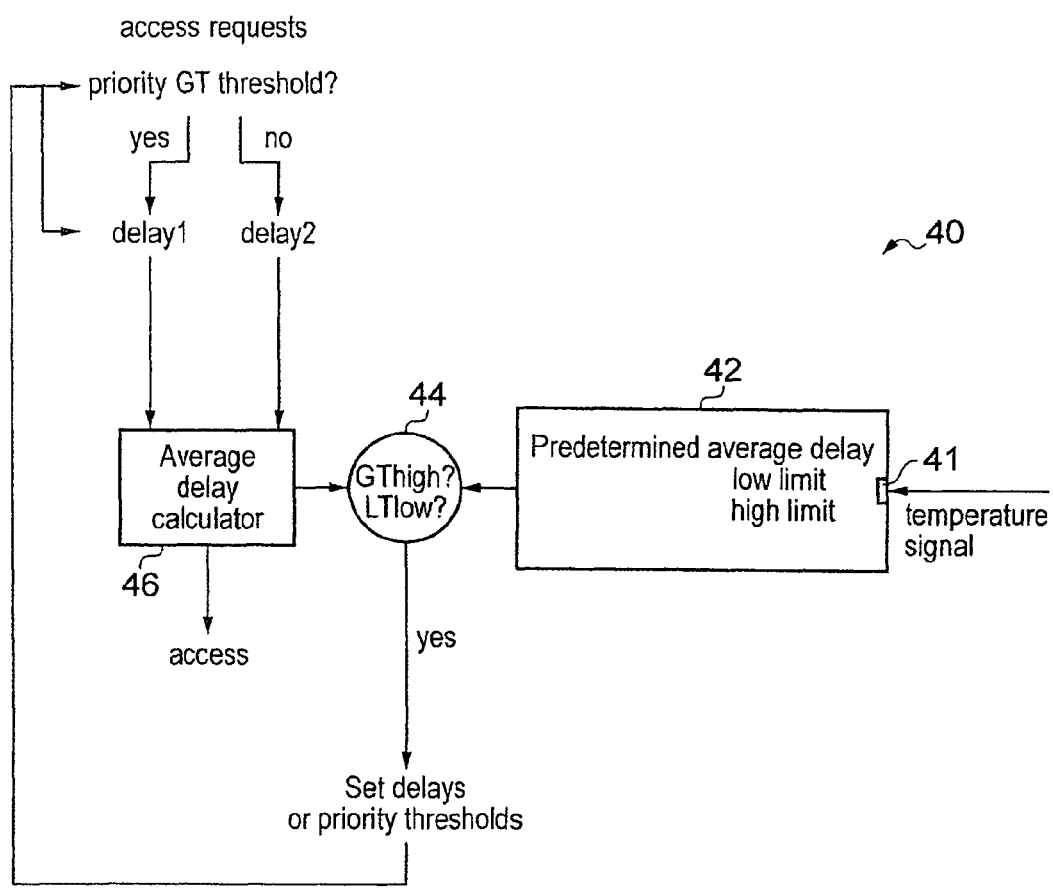
FIG. 3 shows a memory controller according to an embodiment of the present invention.

FIG. 3 schematically shows the functional units inside one example of memory controller 40. There is an input 41 that receives the temperature signal and a storage unit 42 that stores a low limit and high limit for the average delay. If the temperature signal indicates that the temperature has gone outside of predetermined temperature limits the delay low limit or the delay high limit of the average delay is adjusted in order to bring the temperature back within the desired limits.

These high and low average delay limits are output to comparator 44 that compares these limits with the current average delay of access requests accessing the memory which is calculated by average delay calculator 46. If the average delay calculator 46 outputs an average value that is higher than the high limit or lower than the low limit then a signal is output by comparator 44 to adjust or tune the system. This can be done by either changing one of the delay values that is currently being assigned to access requests in dependence upon their perceived priority or it can be done by changing the threshold value at which they are categorised.

Thus, in this embodiment access requests are received and they are categorised into priority categories and given one of two different delays. Thus, if it is determined that the priority of an access request is greater than a threshold value, it is given a shorter delay, delay 1 and if the priority is not greater than the threshold value it is given a longer delay, delay 2. Thus, changing either the threshold value that an access request is categorised with respect to, or the value of delay 1 or delay 2 will in effect vary the average delay of the accesses and depending on the embodiment any one of these values can be tuned in order to achieve an average delay that lies within the desired limits.

Figure 4:
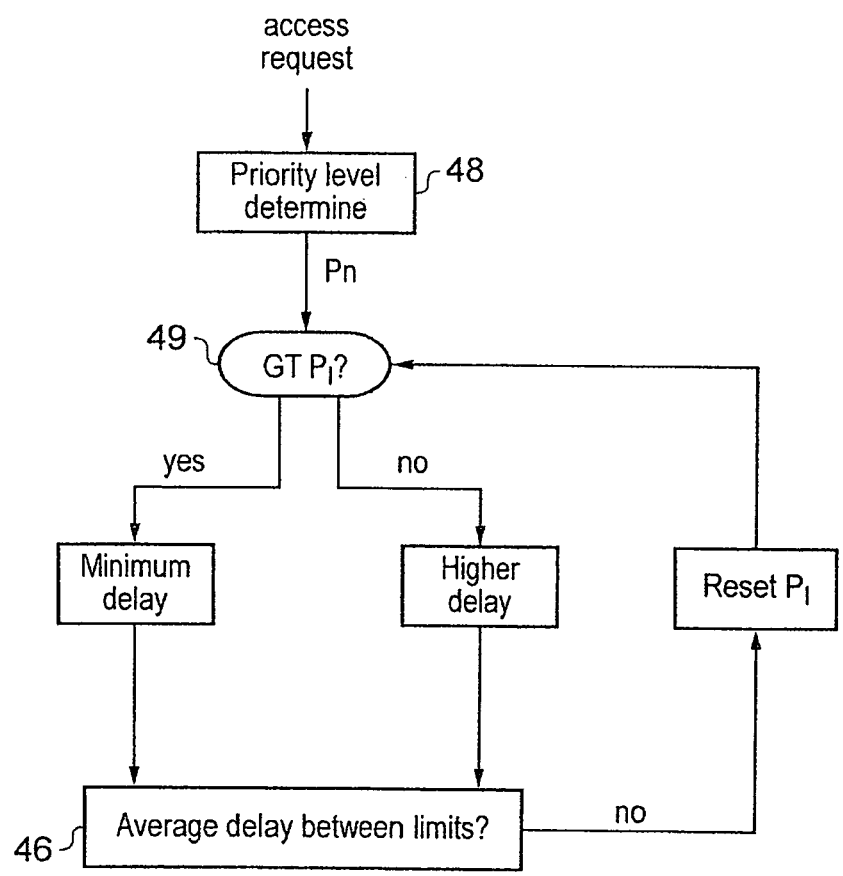
FIG. 4 schematically shows functional arrangements of a memory controller that is tuned by changing priority threshold values according to an embodiment of the present invention.

FIG. 4 shows an embodiment where it is the threshold in the priority levels that is tuned. In this embodiment an access request is received and it does not have a priority level associated with it and thus, a priority level determiner 48 within memory controller 40 determines a priority level of the access request, perhaps in dependence on its source, or perhaps in relation to the type of access request that it is, and it sets a priority level accordingly. Comparator 49 then determines if this priority level is greater than threshold priority level P1. If it is greater than threshold priority level P1 then a minimum delay is assigned to this access request and this access request proceeds to access the memory with this delay. If it is not higher than this threshold value then a higher delay is assigned to it and it proceeds with this higher delay to access the memory. Average delay calculator 46 calculates an average of these delays over a certain time and determines if they are between set high and low limits. If they are not then in this embodiment the value of P1 is reset. P1 is the threshold level which determines how many access requests are in the highest priority category and how many in the lower priority category. Thus, resetting this value will change this proportion and therefore change the average delay time.

Figure 5:
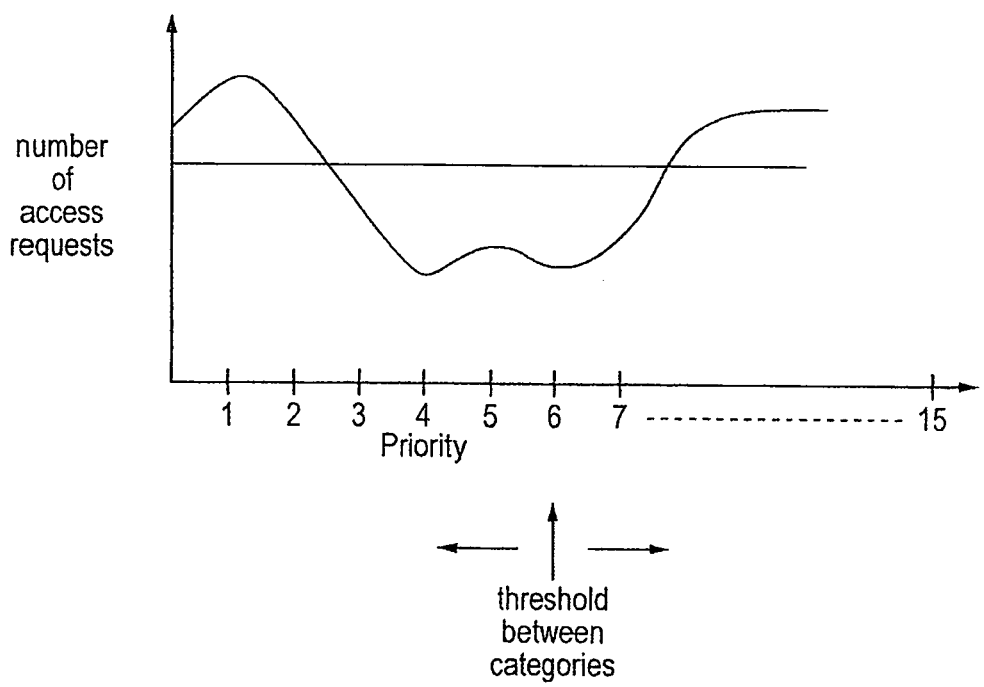
FIG. 5 schematically shows how priority threshold values may vary with access request numbers.

In this regard, FIG. 5 shows an example of number of access requests against priority level. In the example of FIG. 5 there are 15 priority levels assigned to the different access requests which provides a highly accurate system wherein access requests with slightly different priority levels can be discriminated between even if there are far fewer priority categories than priority levels. Thus, if in the example of FIG. 4 with two priority categories, the average access time was becoming too long the priority threshold level between the categories could be reduced so that more access requests fall within the high priority category and the average delay is reduced.

It should be noted that the effect of moving the threshold will depend on the number of access requests in each of the priority levels. FIG. 5 schematically shows how this may vary. For example there may be an equal number of access requests within each priority category or there may be a very unequal number. It should be clear that during processing the number of access requests in each priority level may change and thus, being able to change the threshold level in response to the change in average delay time is a convenient way of tuning the system and keeping it operating within desired limits.

Figure 6:
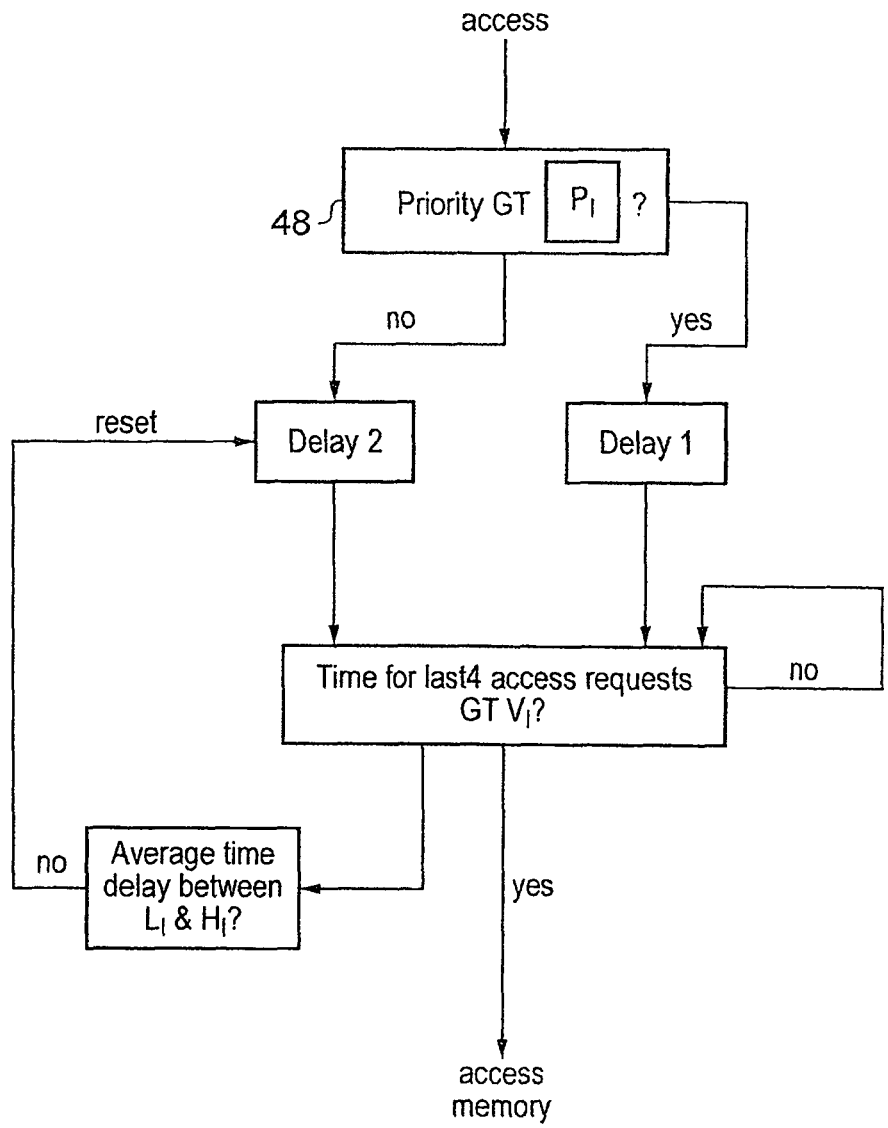
FIG. 6 schematically shows a memory controller tuned by resetting delay times.
Figure 6:
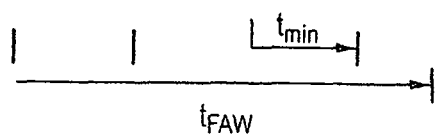

FIG. 6 shows an alternative way of tuning the system where instead of tuning the threshold level the delay is tuned. In this example, in addition to the memory requiring a minimum access delay between adjacent accesses, there is also a requirement that four accesses take at least a certain time.

Thus, as previously, an access request is received and it is determined by comparator 48 if the priority is greater than a threshold value P1. If it is not then a longer delay, delay 2 is given whereas if it is a shorter delay, delay 1 is given. This delay 1 may be the minimum acceptable delay for the memory. It is then determined if the time for the last four access requests is greater than the memory requirement. If it is not then rather than allowing this access request to proceed it is delayed internally until the requirement for the delay for the last four access requests is met at this point the access request is allowed to proceed.

In addition to this there is a calculator of an average time delay and it is determined by this calculator if it is between the desirable low and high limits. If it is not then delay 2 may be reset. Delay 2 may only be reset up to a maximum value and thus, if the maximum value is reached and the average time delay is still too low then delay 1 will be increased. This allows systems where all access requests are high priority for a time to be tuned.

Figure 7:
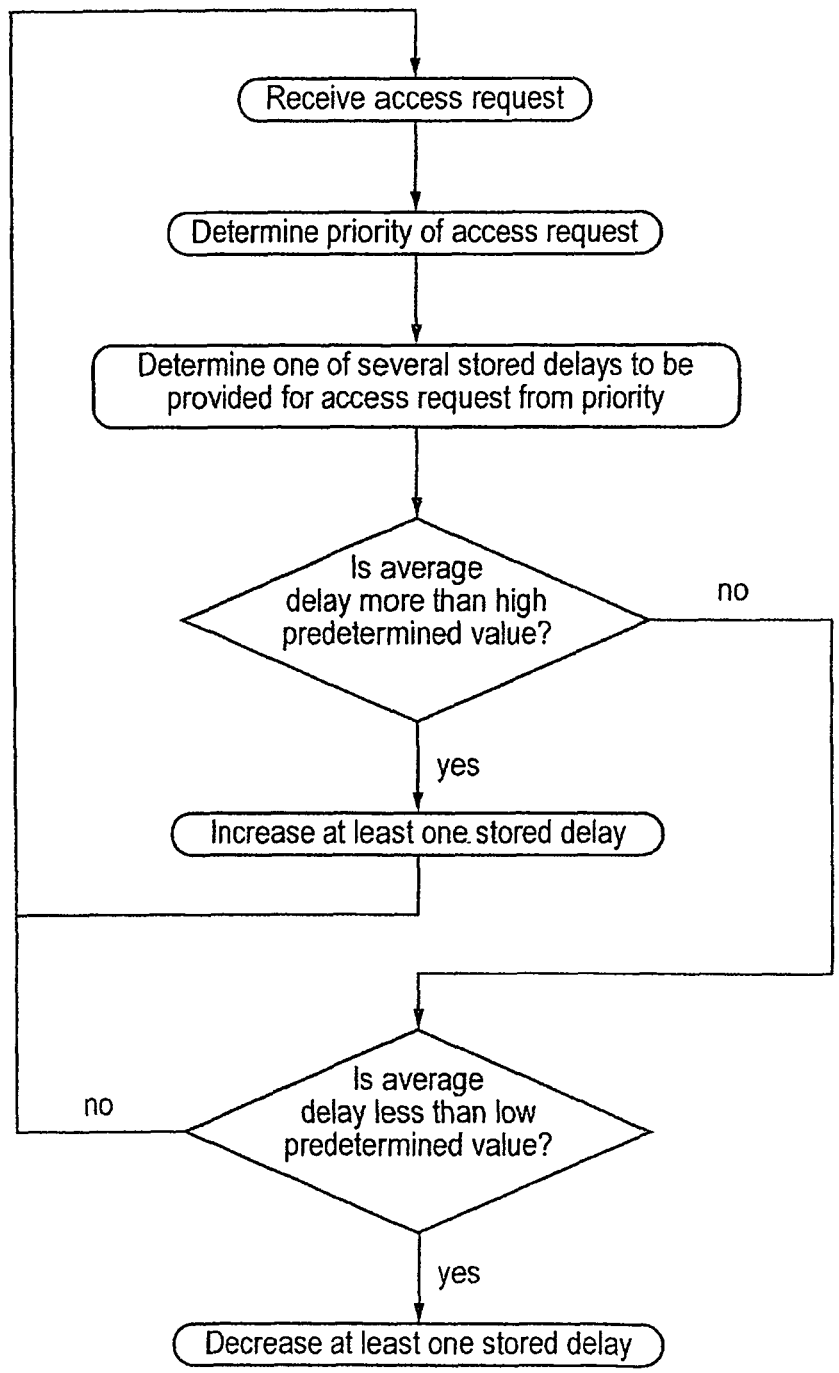
FIG. 7 shows a flow diagram according to an embodiment of the present invention.

FIG. 7 shows very schematically a flow diagram illustrating a method according to an embodiment of the present invention. Initially an access request is received and the priority of that access request is determined. This may be from a priority level associated with the access request or it may be from a property of the access request such as its source or its type. A suitable delay for that access request is then determined from this priority and the access request proceeds with this delay. In this example there are a number of stored delays that can be provided to an access request in dependence on its' perceived priority.

It is then determined if the current average delay of the access requests is greater or less than high or low predetermined values that set the desired operating average delay limits. If it is then the delay to at least some of the access requests is increased or decreased by a certain amount. This is done by changing at least one of the stored delays.

If the average delay is within the desired limits then no change to the stored delays are required.

It should be noted that although in this flow diagram the average delay is shown as being calculated for every access request, in many embodiments it will be calculated periodically and adjustments made as required.

It should be noted that the step of increasing the delay to at least some of the access requests is done in this embodiment by increasing the stored delays for the different priority access requests. It could also be done by changing the number of requests that are given the different delays, so that if the average delay is too low more request can be given longer delays.

Although illustrative embodiments of the invention have been described in detail herein, with reference to the accompanying drawings, it is to be understood that the invention is not limited to those precise embodiments, and that various changes and modifications can be made by one skilled in the art without departing from the scope of the invention that is defined by the appended claims.

We claim:

1. Memory circuitry for storing data comprising:
a memory for storing said data; and
control circuitry configured to control power consumption of said memory by controlling a rate of access to said memory such that an average access delay between adjacent accesses is maintained at or above a predetermined value; wherein
said control circuitry is configured to determine a priority of an access request to said memory and to maintain said average access delay at or above said predetermined value by delaying at least some accesses from access requests having a lower priority for longer than at least some accesses from access requests having a higher priority.

2. Memory circuitry according to claim 1, wherein
said control circuitry is configured to determine said priority of said access request in dependence upon a latency sensitivity of said access request.

3. Memory circuitry according to claim 1, wherein said priority of said access request is determined in dependence upon at least one of:
a type of said access request;
a priority level indicator associated with said access request; and
a source of said access request.

4. Memory circuitry according to claim 1, said memory circuitry further comprising average access delay determining circuitry for determining said average access delay.

5. Memory circuitry according to claim 1, wherein
said control circuitry is configured to categorise each of said access requests into one of at least two different priority categories and to set an access delay for each of said at least two different priority categories, a higher priority category being given a lower access delay.

6. Memory circuitry according to claim 5, wherein
said memory is designed with a minimum access delay between adjacent accesses, said minimum access delay being lower than said average access delay; and
said control circuitry is configured to provide at least some access requests within a highest priority category with said minimum access delay and access requests within lower priority categories with higher access delays, such that said average access delay is maintained at or above said predetermined value.

7. Memory circuitry according to claim 5, wherein
said control circuitry is configured to maintain a same access delay for requests within each of said priority categories, and to categorise said access requests according to a priority of said access request compared to a threshold value for each of said lower priority categories and compared to a current average access delay, such that if said current average access delay falls below a preset low value at least one of said threshold values is increased such that at least some access requests are categorised with a lower priority and if said current average access delay rises above a preset high value at least one of said threshold values is decreased such that at least some access requests are categorised with a higher priority.

8. Memory circuitry according to claim 7, wherein said access requests comprise a priority indicator indicating one of a plurality of priority levels for said access request, said threshold value for each of said lower priority categories being one of said plurality of priority levels.

9. Memory circuitry according to claim 7, wherein said preset low value comprises said predetermined value.

10. Memory circuitry according to claim 5, wherein said control circuitry is configured to vary said access delay provided to requests within each of said priority categories in order to maintain said average access delay at or above said predetermined value and between a preset low and a preset high value.

11. Memory circuitry according to claim 10, wherein said control circuitry is configured to set said access delay of said access requests in a highest priority category to a minimum access delay and to set a higher delay for each of said priority categories other than said highest priority category, each of said higher delays being limited by a maximum delay, and to increase said access delay of at least one of said access requests in said highest priority category to above said minimum access delay if said average access delay would otherwise fall below said low preset value.

12. Memory circuitry according to claim 1, wherein said memory comprises a dynamic memory.

13. Memory circuitry according to claim 12, wherein said dynamic memory comprises a dynamic random access memory or DRAM, said DRAM comprising a plurality of banks each bank comprising an array, an access to said memory comprising activating a row of one of said banks in dependence upon a row address.

14. Memory circuitry according to claim 1, said memory control circuitry further comprising temperature detection circuitry for detecting a temperature of said memory, said control circuitry being configured to increase said predetermined value in response to a signal from said temperature control circuitry indicating a temperature of said memory circuitry has risen above a certain temperature.

15. A data processing apparatus comprising:
a processor for processing data; and
memory circuitry according to claim 1, for storing said data processed by said processor.

16. A method of accessing a memory comprising:
receiving an access request for accessing said memory;
determining a priority of said access request;
providing a delay to said access request in dependence upon said priority by delaying at least some accesses from access requests having a lower priority for longer than at least some accesses from access requests having a higher priority such that an average access delay between adjacent accesses is maintained at or above a predetermined value.

17. A method according to claim 16, said method comprising a further step of after having determined a priority of said access request, categorising said access request into one of at least two different priority categories, a size of said access delay being provided depending on said priority category said access request is in.

18. A method according to claim 17, wherein said memory is designed with a minimum access delay between adjacent accesses, said minimum access delay being lower than said average access delay, said step of providing said delay comprising:

providing at least some access requests within a highest priority category with said minimum access delay and access requests within lower priority categories with higher access delays, such that said average access delay is maintained above said predetermined value.

19. A method according to claim 17, wherein
said method maintains a same access delay for requests within each of said priority categories, and categorises said access requests according to both a priority level of said access request and a current average access delay, such that if said current average access delay is lower than a preset low value a threshold between said priority categories is increased such that fewer access requests are categorised as high priority and if said current average access delay is higher than a preset high value said threshold is decreased.

20. A method according to claim 17, wherein said access delay provided to requests within each of said priority categories is varied in order to maintain said average access delay above said predetermined value.

21. A method according to claim 16, wherein said method comprises a further step of calculating said average access delay.

22. A method according to claim 16, comprising a further step of detecting a temperature of said memory and in response to said temperature exceeding a predetermined temperature increasing said predetermined value.

\* \* \* \* \*